United States Patent [19]

Sato

[11] Patent Number: 4,865,396
[45] Date of Patent: Sep. 12, 1989

[54] METHOD AND APPARATUS FOR ANTI-LOCK BRAKING IN A FOUR WHEEL DRIVE VEHICLE

[75] Inventor: Makoto Sato, Wako, Japan

[73] Assignee: Honda Giken Kogyo Kabushiki Kaisha, Tokyo, Japan

[21] Appl. No.: 223,563

[22] Filed: Jul. 25, 1988

Related U.S. Application Data

[63] Continuation of Ser. No. 927,526, Nov. 5, 1986, abandoned.

[30] Foreign Application Priority Data

| Nov. 5, 1985 | [JP] | Japan | 60-247329 |
| Nov. 5, 1985 | [JP] | Japan | 60-247330 |
| Nov. 5, 1985 | [JP] | Japan | 60-247331 |

[51] Int. Cl.⁴ .............. B60T 8/64; B60K 17/356; B60K 17/344
[52] U.S. Cl. .............. 303/110; 303/100; 303/111; 180/244; 180/248
[58] Field of Search ............. 180/197, 233, 244, 247, 180/248, 249; 188/181 C, 181 A; 303/9.62, 96, 100, 103, 105, 106, 110, 111, 113

[56] References Cited

U.S. PATENT DOCUMENTS

| 3,802,749 | 4/1974 | Carp et al. | 303/96 |
| 4,036,536 | 7/1977 | Quon | 303/96 |
| 4,439,832 | 3/1984 | Sato et al. | 303/111 X |
| 4,526,426 | 7/1985 | Sato et al. | 303/105 X |
| 4,562,897 | 1/1986 | Renneker | 180/233 |
| 4,589,511 | 5/1986 | Leiber | 180/244 |
| 4,601,359 | 7/1986 | Weismann et al. | 180/248 |
| 4,626,042 | 12/1986 | Burckhardt | 303/106 |
| 4,657,314 | 4/1987 | Leiber | 303/100 |
| 4,735,279 | 4/1988 | Sato | 180/244 |
| 4,746,173 | 5/1988 | Fennel et al. | 180/244 X |
| 4,758,053 | 7/1988 | Yasumo | 303/111 X |
| 4,765,429 | 8/1988 | Sato | 180/244 X |
| 4,765,433 | 8/1988 | Fujii et al. | 180/244 |

FOREIGN PATENT DOCUMENTS

| 2610585 | 9/1977 | Fed. Rep. of Germany | 303/100 |
| 0001061 | 1/1985 | Japan | 303/111 |

Primary Examiner—Andres Kashnikow
Assistant Examiner—Timothy Newholm
Attorney, Agent, or Firm—Roberts, Spiecens & Cohen

[57] ABSTRACT

A four wheel drive vehicle with brakes equipped for respective wheels on front and rear axles, in which an anti-lock control device is provided to control the braking pressure applied to the brakes so as to reduce the pressure when an associated wheel is about to be locked. The antilock control of the braking pressure for the wheels on the front axle and the control of the braking pressure for the wheels on the rear axle are conducted individually and reduction of the braking pressure for the rear wheels is effected more intensely than reduction of the pressure for the front wheels.

23 Claims, 7 Drawing Sheets

METHOD AND APPARATUS FOR ANTI-LOCK BRAKING IN A FOUR WHEEL DRIVE VEHICLE

This is a continuation of U.S. application Ser. No. 9,275,526, filed 11-5-1986, now abandoned.

BACKGROUND OF THE INVENTION

1. Field of the Invention

This invention relates to a method and apparatus for carrying out anti-lock braking in a four wheel drive vehicle, in which a power unit is connected to one of the front and rear axles, the other axle being connected to the power unit via a torque transmission.

2. Description of the Prior Art

In a conventional four wheel drive vehicle, brakes are generally provided on all four wheels thereof.

In this vehicle, the front and rear axles are connected an anti-lock brake system is basically designed to control the braking torque for each wheel or axle individually and thereby retain a slip ratio of each wheel at a suitable level, and it is necessary that the speed of each wheel or axle be varied irrespective of one another. On the other hand, in a vehicle in which the front and rear axles are connected substantially rigidly, these axles interfere with each other insofar that braking action on one affects the other. Therefore, it is impossible to provide suitable anti-lock control for each brake in a conventional vehicle which is provided with a brake on each wheel.

In a vehicle in which the front and rear axles are connected substantially rigidly, setting the wheels on one axle to a suitable slip ratio necessarily cuases the slip ratio of the wheels on the other axle to attain a substantially suitable level.

Therefore, if brakes are provided on the front wheels alone so as to obtain a force for braking all the wheels and these brakes are provided with an anti-lock control means, the above problems can be solved.

However, the braking of all the wheels is effected only by the brakes for the front wheels and therefore the load on the brakes becomes large and it is difficult in some cases to increase the capacity of the brakes due to the small space around the front wheels.

SUMMARY OF THE INVENTION

It is an object of the present invention to provide a four wheel drive vehicle in which brakes are provided on the rear wheels as well as on the front wheels so as to lessen the loads on the brakes of the front wheels, the brakes for the rear wheels being provided with anti-lock control means which is so constructed to minimize the rear wheel interference with the front wheels.

To achieve this object, the present invention provides a four wheel drive vehicle comprising brakes on the wheels mounted on both of the two axles, a hydraulic braking system for controlling the hydraulic pressure supplied to the brakes, and an anti-lock control means coupled to the hydraulic braking system for reducing the hydraulic braking pressures when the wheels are about to be locked, said anti-lock control means having a front wheel control portion for controlling the brakes for the front wheels separately, and a rear wheel control portion for controlling the brakes for the rear wheels separately, the rear wheel control portion including means for promoting the reduction of the hydraulic braking pressures applied to the rear wheels as compared to the reduction of the braking pressures applied to the front brakes by the front wheel control portion.

By virtue of this construction, the slip ratio of the rear wheels becomes lower than that of the front wheels so that rear wheel interference with the front wheels can be minimized.

The above and other objects as well as advantageous features of the invention will become apparent from the following description of the preferred embodiments taken in conjunction with the accompanying drawings.

DETAILED DESCRIPTION OF THE PREFERRED EMBODIMENTS

The embodiments of the present invention will now be described with reference to the drawings. First, referring to FIG. 1, which shows an embodiment of a four wheel drive vehicle of the present invention, therein are seen left and right front wheels Wfl, Wfr and left and right rear wheels Wrl, Wrr at the front and rear portions of a chassis (not shown).

Figure 1:
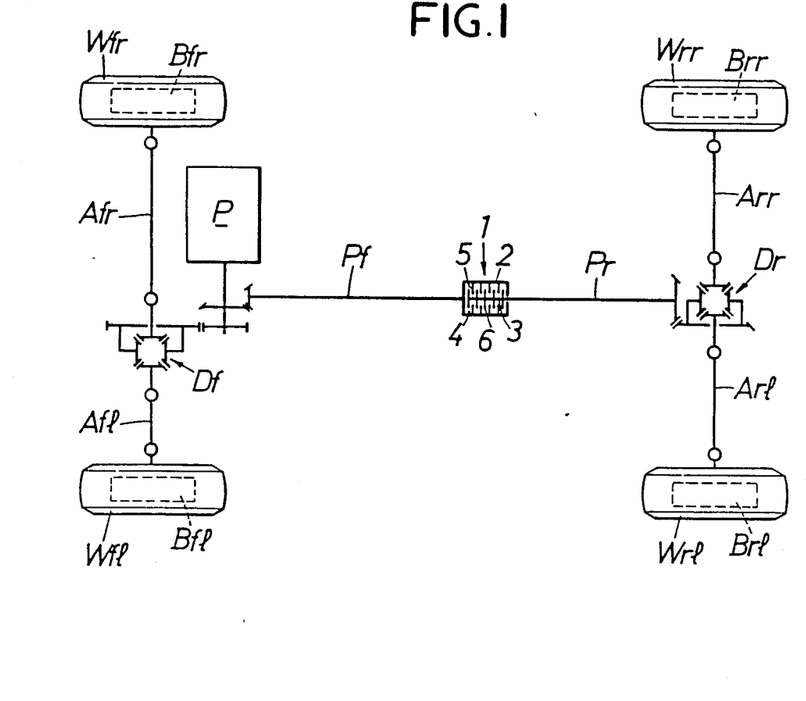
FIG. 1 is a schematic diagram of a driving system of a four wheel drive vehicle.

A pair of front axles Afl, Afr are joined to the left and right front wheels Wfl, Wfr and are connected to each other by a front differential gear Df, while a pair of rear axles Arl, Arr are joined to the left and right rear wheels Wrl, Wrr and are connected to each other by a rear differential gear Dr. A power unit P including an engine (not shown) and a transmission (not shown) is connected to an input portion of the front differential gear Df. A rear propeller shaft Pr is connected to an input portion of the rear differential gear Dr. The rear propeller shaft Pr is connected coaxially to a front propeller shaft Pf by a viscous clutch 1 which serves as a torque transmission and the driving force of the power unit P is transmitted to the front propeller shaft Pf.

The viscous clutch 1 consists of outer and inner members 2, 3 which rotate relative to each other. The outer clutch member 2 is in the from of a housing and the inner clutch member 3 is in the form of a shaft which is rotatably mounted in sealed relation in the housing. A sealed oil chamber 4 is formed between the inner and outer clutch members 3, 2, and a highly viscous oil with a small quantity of air which permits thermal expansion of the highly viscous oil is sealed in the chamber 4. A plurality of outer clutch plates 5 are spline connected to the outer clutch member 2 and a plurality of inner clutch plates 6 are spline connected to the inner clutch member 3, the clutch plates 5, 6 being juxtaposed to each other. Each of the plates 5, 6 is provided with openings (not shown) for permitting oil to flow there-through. The outer clutch member 2 is unitarily secured to the front propeller shaft Pf, and the inner clutch member 3 to the rear propeller shaft Pr.

When relative rotation occurs between the inner and outer clutch members 2, 3 in the viscous clutch 1, the clutch plates 5, 6 rotate relative to each other as the highly viscous oil is sheared therewith, and the viscous transmission of torque is carried out between the clutch plates 5, 6. When the relative rotational speed of the clutch plates has further increased, a complicated temperature gradient occurs therein due to an increase in the oil temperature. Due to the multiplied effect of the strain in the clutch plates 5, 6 caused by such temperature gradient and an increase in the pressure in the sealed oil chamber 4, a frictionally contacting portion or a very narrow clearance occurs between adjacent clutch plates 5, 6 so that the frictional transmission of torque is carried out between the inner and outer clutch members 2, 3.

With such viscous clutch 1, the front and rear propeller shafts Pf, Pr, and consequently, the front and rear axles Afl, Afr; Arl, Arr, are connected substantially rigidly at all times, and the front and rear wheels Wfl, Wfr; Wrl, Wrr interfere with each other when braking action is applied to the wheels.

The front wheels Wfl, Wfr are provided with brakes Bfl, Bfr, and the rear wheels Wrl, Wrr with brakes Brl, Brr, the latter being of a comparatively small capacity.

Figure 2:
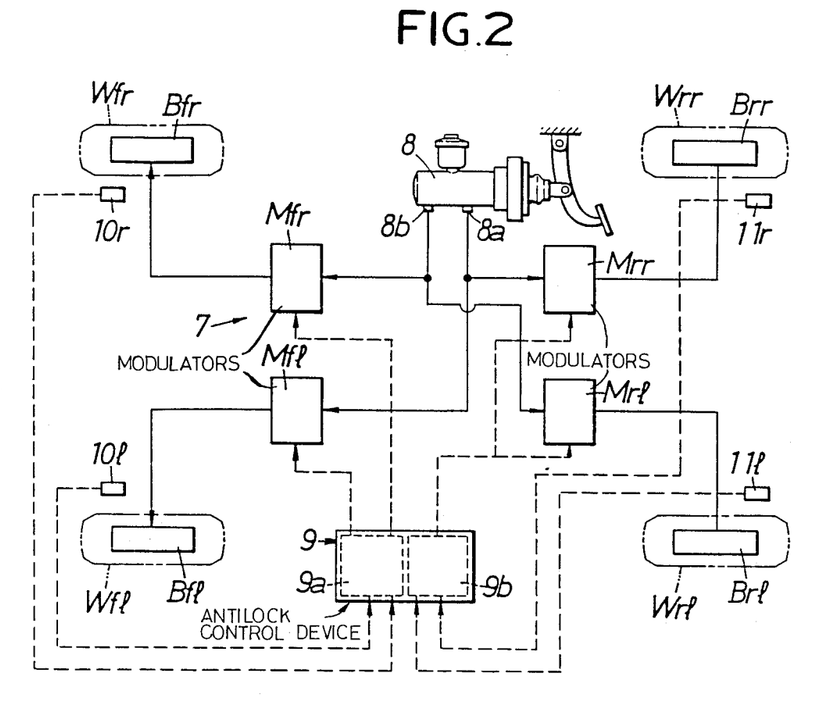
FIG. 2 is a schematic diagram of a brake system therefor according to a first embodiment of the invention.

Referring to FIG. 2, a hydraulic braking pressure system 7 for controlling the brakes Bfl, Bfr, Brl, Brr is provided with a tandem type master cylinder 8 having a pair of output ports 8a, 8b, modulators Mfl, Mrr for regulating the hydraulic pressure transmitted from the output port 8a, and for introducing the resultant hydraulic pressure to the brake Bfl for the left front wheel and the brake Brr for the right rear wheel, and modulators Mfr, Mrl for regulating the hydraulic pressure, transmitted from the output port 8b, and for introducing the resultant hydraulic pressure to the brake Bfr for the right front wheel and the brake Brl for the left rear wheel. The hydraulic braking pressure system 7 is additionally provided with an anti-lock control means 9 for controlling the operations of the modulators Mfl, Mfr, Mrl, Mrr to prevent the wheels from being locked.

The anti-lock control means 9 has a front wheel control portion 9a for separately controlling the modulators Mfl, Mfr for the front wheels Wfl, Wfr, and a rear wheel control portion 9b for simultaneously controlling the modulators Mrl, Mrr for the rear wheels Wrl, Wrr. Signals from detectors 10l, 10r for detecting the rotational speeds of the front wheels Wfl, Wfr are fed to the front wheel control portion 9a, and signals from detectors 11l, 11r for detecting the rotational speeds of the rear wheels Wrl, Wrr are fed to the rear wheel control portion 9b.

Figure 3:
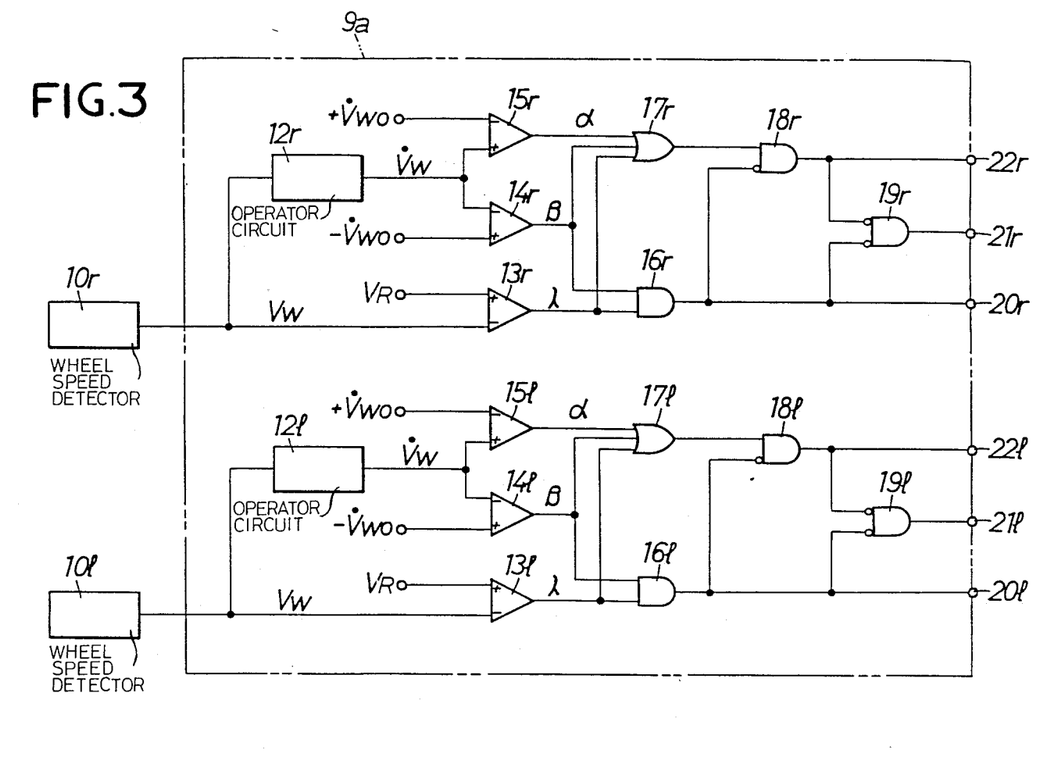
FIG. 3 is a schematic diagram of a front wheel control portion of the brake system in FIG. 2.

The construction of the front wheel control portion 9a will now be described with reference to FIG. 9 in addition to FIGS. 1 and 2. The part of the front wheel control portion 9a which corresponds to modulator Mfl and the part thereof which corresponds to the modulator Mfr have basically the same construction. Therefore, the part of the control portion 9a which relates to the modulator Mfl will be described with reference letter "l" added to each element thereof, and the part thereof which relates to the modulator Mfr essentially will merely be illustrated with reference letter "r" added to each element thereof.

In order to determine whether a wheel is about to be locked or not, a wheel speed Vw detected by the detector 10l is fed to a reverse terminal of a first comparator 13l and also to an arithmetic operator circuit 12l which functions as a differentiator, and a wheel acceleration Vw obtained in the arithmetic circuit 12l is fed a reverse terminal of a second comparator 14l and also to a non-reverse terminal of a third comparator 15l. In the first comparator 13l, a reference wheel speed $V_R$, which has been fed to a non-reverse terminal thereof, and the vehicle speed Vw are compared. When $V_R > Vw$, a signal λ for reducing the hydraulic braking pressure is supplied at the output of the first comparator 13l. In the second comparator 14l, a reference wheel deceleration $-\dot{V}wo$, which has been fed to a non-reverse terminal thereof, and the wheel acceleration $\dot{V}w$ are compared. When $-\dot{V}wo > \dot{V}w$, a signal β for reducing the hydraulic braking pressure is supplied at the output of the second comparator 14l. In the third comparator 15l, a reference wheel acceleratio $+\dot{V}w$ is fed to a reverse terminal thereof and is compared with the wheel acceleration $\dot{V}w$. When $\dot{V}w > +\dot{V}wo$, a signal α is supplied at the output of the third comparator 15. The signal α is used to determine whether the wheel speed Vw is increasing, and the period of time during which the reduction of the hydraulic braking pressure is to be continued is determined by signal α.

An output terminal of the first comparator 13l is connected to an input terminal of an AND-gate 16l and an input terminal of an OR-gate 17l. An output terminal of the second comparator 14l is connected to input terminals of AND-gate 16l and OR-gate 17l. An output terminal of the third comparator 15l is connected to the input terminal of the OR-gate 17l.

The output terminal of the AND-gate 16l is connected to inverted input terminals of AND-gates 18l, 19l and also to an output terminal 20l. The output terminal of the OR-gate 17l is connected to the input terminal of the AND-gate 18l. The output terminal of the AND-gate 18l is connected to an output terminal 22l and to an inverted input terminal of the AND-gate 19l. The output terminal of the AND-gate 19l is connected to an output terminal 21l.

In the front wheel control portion 9a thus constructed, signals to reduce braking pressure are supplied at the output terminals 20l, 20r, and signals for maintaining the braking pressures at predetermined levels at the output terminals 22l, 22r. The modulator Mfl is operated in accordance with the signals from the output terminals 20l, 21l, 22l, while the other modulator Mfr is operated in accordance with the signals from the output terminals 20r, 21, 22r, whereby anti-lock control of the two brakes Bfl, Bfr can be effected separately.

Figure 4:
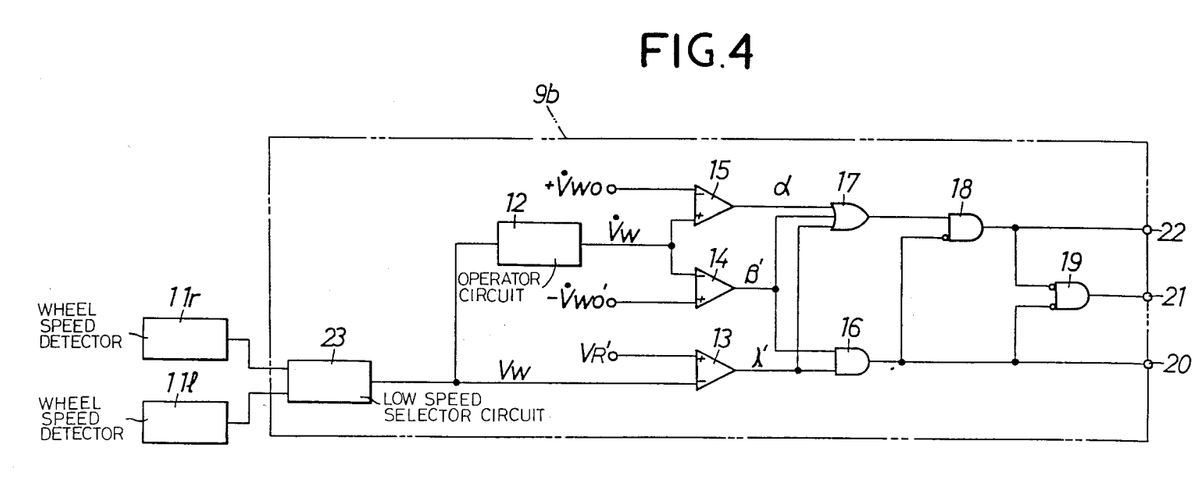
FIG. 4 is a schematic diagram of a rear wheel control portion of the brake system in FIG. 2.

The construction of the rear wheel control portion 9b will now be described with reference to FIG. 4. The construction of this rear wheel control portion 9b is similar to that of the front wheel control portion 9a. The elements of the rear wheel control portion 9b which correspond to those of the front wheel control portion 9a will therefore be illustrated with the same reference numerals without reference letters "l", "r".

It should be noted in particular that in the rear wheel control portion 9b, the wheel speeds detected by the detectors 11l, 11r are supplied to a low-selectivity circuit 23 in which the lower wheel speed is selected. The output of circuit 23 is connected to a first comparator 13 and operation circuit 12. Anti-lock control is carried out on the basis of which of the left and right wheels Wrl, Wrr, is more easily locked, i.e. the wheel having the lower wheel speed. The operations of the two modulators Mrl, Mrr are controlled simultaneously by the control signals supplied at the output terminals 20, 21, 22.

Moreover, in the rear wheel control portion 9b, the reference parameters or values for determining whether a wheel is to be subject to an anti-locking operation are set at a lower level than those in the front wheel control portion 9a. In other words, the parameters or values are set so that the braking pressures applied to the rear wheels will be more readily reduced as compared to the braking pressures applied to the front wheels. Namely, the reference wheel speed $V_R'$ supplied to the non-reverse terminal of the first comparator 13 is set higher ($V_R' > V_R$) than the reference wheel speed $V_R$ in the front wheel control portion 9a. When $V_R° > V_W$, a signal $\lambda'$ for reducing the hydraulic braking pressure is supplied at the output of the first comparator 13. A reference wheel deceleration $-\dot{V}wo'$ is fed to the non-reverse terminal of the second comparator 14 and the value of $-\dot{V}wo'$ is set higher that the reference wheel deceleration $-\dot{V}wo$ in the front wheel control portion 9a ($-\dot{V}wo' > -\dot{V}wo$). When $-\dot{V}wo' > \dot{V}w$, a signal $\beta'$ for reducing the hydraulic braking pressure is supplied at the output of the second comparator 14.

The operation of this embodiment will now be described. In the case when the hydraulic braking pressures become excessively high when a braking operation is carried out during vehicle travel, by supplying hydraulic pressure to the brakes Bfl, Bfr; Brl, Brr to apply braking forces to the wheels Wfl, Wfr; Wrl, Wrr, the slip ratios of the rear wheels Wrl, Wrr are controlled to be lower than those of the front wheels since the reference values for determining whether the rear wheels Wrl, Wrr are about to be locked are set at a less intense level in the rear wheel control portion 9b of the anti-lock control means 9 than the corresponding values in the front wheel control portion 9a. Namely, the braking torque in the rear wheels Wrl, Wrr becomes low due to the rear wheel driving force of the road surface, so that the interference of the rear wheels Wrl, Wrr with the front wheels Wfl, Wfr can be minimized. This permits an excellent anti-lock controlling operation to be carried out.

Since the front wheel control portion 9a controls the modulators Mfl, Mfr for the front wheels separately, excellent effects with respect to braking distance and running stability can be obtained. In a four-wheel drive vehicle in which the front wheels Wfl, Wfr and the rear wheels Wrl, Wrr are connected substantially rigidly, the control of the front wheels Wfl, Wfr has influence upon the ration of the rear wheels Wrl, Wrr. Therefore, if a high-selectivity system in which the modulators Mfl, Mfr are controlled simultaneously in accordance with the higher speed of the two front wheels, there is the possibility that one of the front wheels Wfl, Wfr may be locked. Moreover, the locking of a front wheel influences the rear wheels Wrl, Wrr to cause them to slip. This causes the running stability of the vehicle to be reduced. If a low-selectivity system in which the brakes Bfl, Bfr are controlled simultaneously on the basis of the lower speed of the two front wheels Wfl, Wfr is employed, the braking distance obviously increases. In the above description, it is assumed that the front wheels bear a greater proportion of the weight of the vehicle than the rear wheels.

In the above embodiment, the modulators Mrl, Mrr for the rear wheels have been disclosed as being controlled simultaneously by a low-selectivity system. They may also be controlled separately.

Figure 5:
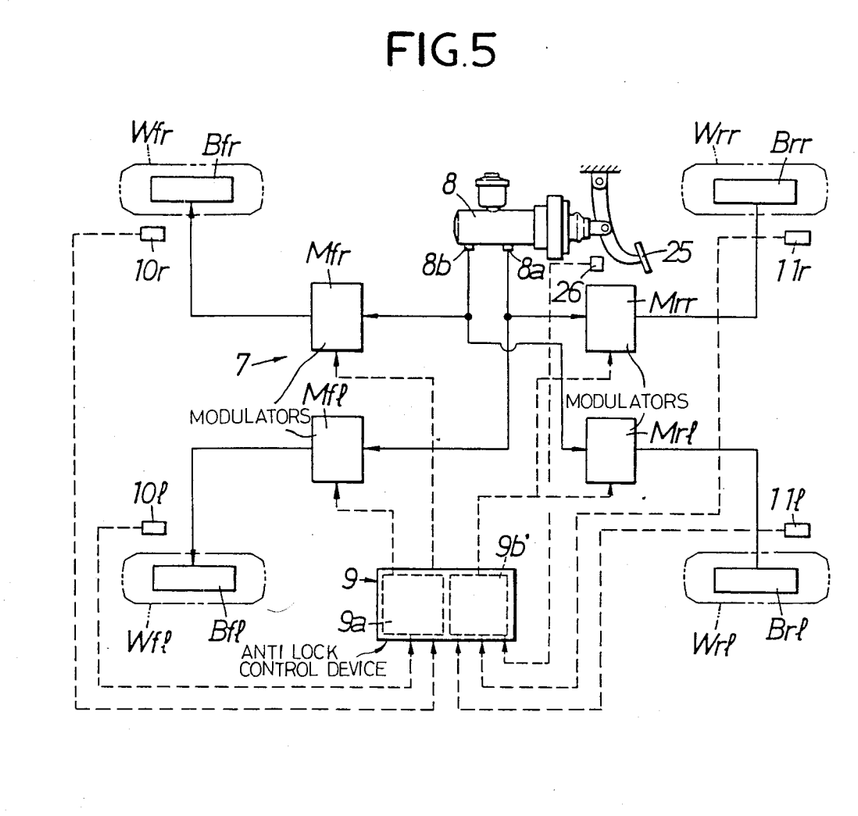
FIG. 5 is a schematic diagram of a brake system according to a second embodiment of the invention.
Figure 6:
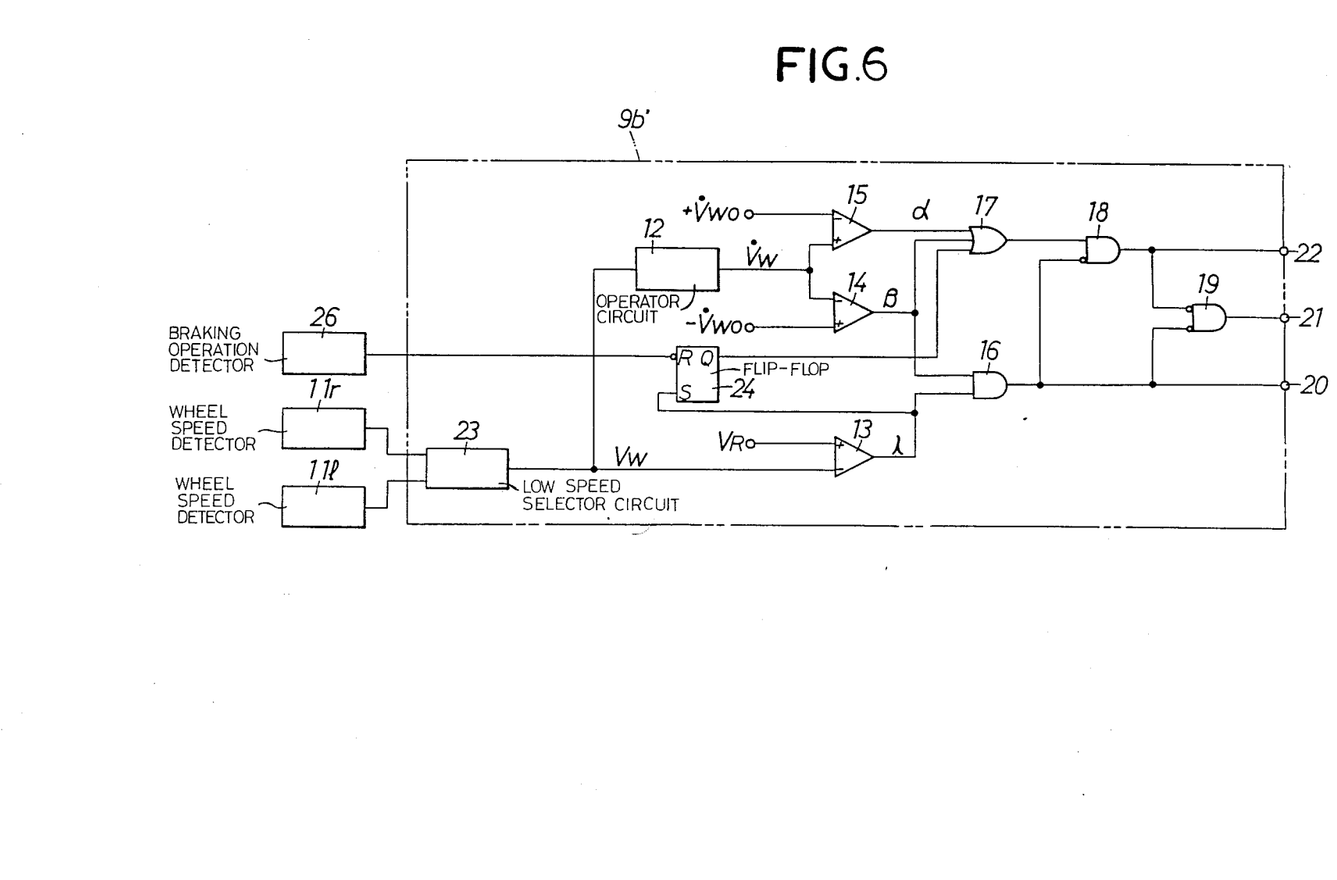
FIG. 6 is a schematic diagram of a rear wheel control portion of the brake system in FIG. 5.

FIGS. 5 and 6 show a second embodiment of the present invention, in which parts corresponding to those of the first embodiment are designated by the same reference numerals.

In the rear wheel control portion 9b', a flip-flop 24 is inserted between the output terminal of first comparator 13 and an input terminal of OR-gate 17. Namely, the output terminal of the first comparator 13 is connected to a set input terminal S of the flip-flop 24 and a set output terminal Q of the flip-flop 24 is connected to an input terminal of OR-gate 17. A braking operation detector 26' which supplies a signal of high level when a braking operation by a brake pedal 25 (refer to FIG. 5) is detected, is connected to an inverted reset input terminal of the flip-flop 24.

When a signal $\lambda$ of high level is supplied at the output of the first comparator 13, the set output from the flip-flop 24 is kept at a high level until the output of the braking operation detector 26 has assumed a low level after completion of the braking operation, i.e., until a reset input to the flip-flop 24 has reached a high level. Accordingly, the output of the OR-gate 17 is also maintained at a high level. As a result, during an anti-lock control operation, the output of the AND-gate 19, i.e., the output at output terminal 21 does not become high until the completion of the braking operation, so that the hydraulic braking pressures supplied to the rear wheel brakes Brl, Brr are reduced or maintained at a predetermined level.

The operation of the second embodiment will now be described. In the case where the hydraulic braking pressures have become excessively high when a braking operation is carried out during vehicle travel by supplying hydraulic braking pressures to the brakes Bfl, Bfr, Brl, Brr to apply braking force to the wheels Wfl, Wfr; Wrl, Wrr and the rear wheel control portion 9b' determines that the rear wheel Wrl, Wrr are about to be locked, signals $\lambda$ and $\beta$ are produced and a pressure reducing signal is supplied at output terminal 20 to reduce the hydraulic pressures supplied to the rear wheels Wrl, Wrr. Moreover, the level of the set output from the flip-flop is high, so that the level of the output from the OR-gate 17 is also high.

When the hydraulic braking pressures have been reduced to remove the possibility that the wheels can become locked, the levels of the signals, $\beta$, $\lambda$ drop so that the level of the output from the output terminal 20 becomes low. However, since the level of the output from the OR-gate 17 is still high, the level of the output from AND-gate 18 is high, and a signal for maintaining the hydraulic braking pressures at a predetermined level is supplied to output terminal 22. Therefore, the hydraulic braking pressures to the rear wheels Wr, Wrr are maintained at the lower level, and the slip ratios are reduced. Consequently, the interference of the rear wheels Wrl, Wrr with the front wheels Wfl, Wfr can be minimized, and an excellent anti-lock control operation can be carried out.

During a braking operation, the conditions of the road surface may vary with consequent variation of the coefficient of friction. In such a case, the hydraulic braking pressures often increase to an excessively high level if these pressures are maintained at a predetermined level as mentioned above. In this case, a judgement that the wheels are about to be locked again is made, and signals $\lambda$, $\beta$ of high level are supplied at the output of the first and second comparators 13, 14 whereby the hydraulic braking pressures are reduced.

The flip-flop 24 may also be set so that the level of the set output becomes high during a fall part of the signal λ or during a rise or fall part of the signal β.

Figure 7:
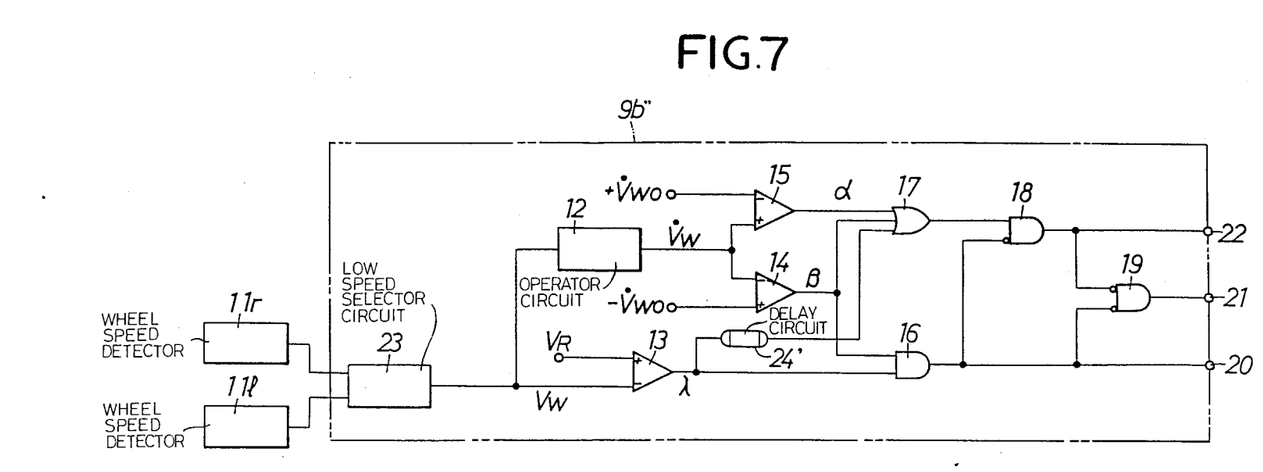
FIG. 7 is a schematic diagram of a rear wheel control portion of a third embodiment of the invention.
Figure 8:
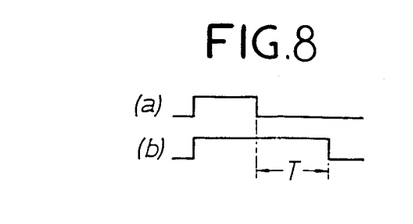
FIGS. 8a and 8b is a diagrammatic illustrations of the characteristic circuit in FIG. 7.

FIGS. 7 and 8 show a third embodiment of the present invention, in which parts corresponding to those of the previously described first and second embodiments are designated by the same reference numerals.

The rear wheel control portion 9b'' is similar to that of the first embodiment. It should be noted that a delay circuit 24' is inserted between the output terminal of first comparator 13 and the input terminal of OR-gate 17. The delay circuit 24' produces an output signal as shown in FIG. 8b of a high level during a rise part of signal of FIG. 8a λ, and continues to produce the same signal for a predetermined periof of time T, for example, 0.5–1 second after a fall part of the signal λ.

According to this arrangement, the level of the output from the OR-gate 17 remains high until the predetermined period of time T has elapsed after the signal from the first comparator 13 has reached a low level. Therefore, the output from the AND-gate 19, i.e. the output at the output terminal 21 does not reach a high level during this time, so that the hydraulic braking pressures for the rear wheels Brl, Brr do not increase during this time.

The operation of this third embodiment will now be described. In the case where the hydraulic braking pressures become excessively high when a braking operation is carried out during vehicle travel by supplying hydraulic braking pressures to the brakes Bfl, Bfr; Brl, Brr to apply braking force to the wheels Wfl, Wfr; Wr l, Wrr, a determination that the rear wheels Wrl, Wrr are about to be locked is made by the rear wheel control portion 9b'', and signals λ, β are supplied therefrom whereby a pressure reducing signal is supplied at the output terminal 20. Consequently, the hydraulic braking pressures for the rear wheels Wrl, Wrr are reduced.

When the possibility of locking of the wheels is removed due to the reduction of the hydraulic braking pressures, the levels of the signals β, λ become low, so that the level of the signal at the output terminal 20 also becomes low. However, since the output at the OR-gate 17 is at a high level until the predetermined period of time T has elapsed after the signal λ has reached a low level, the level of the output from the AND-gate 18 becomes high, and a signal for maintaining the hydraulic pressures is supplied at the output terminal 22. Hence, during this time, the hydraulic pressures supplied to the rear wheels Wrl, Wrr are maintained at low levels, and the slip ratios are reduced. Consequently, interference of the rear wheels Wrl, Wrr with the front wheels Wfl, Wfr is minimized, and an excellent antilock control operation is carried out.

The conditions of the road surface may vary during a braking operation such that the coefficient of friction increases. In such a case, if the hydraulic braking pressures for the rear wheels Wrl, Wrr continue to be maintained at low levels, no functional problems will occur but the braking pressures may prove to be too low. As a result, the loads on the front wheels Wfl, Wfr increase, and it may give rise to a problem of the reduction of these loads. However, since the period during which pressure increase is prevented, after a pressure reducing operation, is limited to about 0.5–1 second in practice, the reduction of the loads on the front wheels Wfl, Wfr can be attained.

The delay circuit 24' may be inserted between the second comparator circuit 14 and OR-gate 17.

The first, second and third embodiments described above all serve to promote the reduction of hydraulic braking pressure applied to the brakes of the rear wheels as compared to the hydraulic braking pressure applied to the brakes of the front wheels. In the first embodiment reduction of pressure takes place more readily due to the higher reference values, whereas in the second and third embodiments, the reduction of pressure is carried out for a longer period of time.

While the invention has been described in relation to a specific embodiment thereof, it would be apparent to those skilled in the art that numerous modification and variations can be made within the scope and spirit of the invention as defined in the attached claims.

What is claimed is:

1. A method of providing an antilock brake action on the brakes of front and rear wheels mounted on the front and rear axles of a four wheel vehicle having a power unit drivingly connected to the axles, the brakes for the wheels on one of the axles being subjected to greater braking force during braking than the brakes on the other of the axles, said method comprising:

applying hydraulic braking pressure to the brakes during a braking operation; the front and rear axles being interconnected for drive and providing transmission of braking force between the axles when braking force is applied to the wheels on either axle;

sensing conditions of the wheels to determine when a wheel is about to become locked;

controlling, by a first wheel control section, the braking pressure applied to the brakes for the wheels on said one axle to reduce the braking pressure to each of the wheels on the one axle which is about to be locked, separately from each other;

controlling separately from the control of the braking pressure to the brakes for the wheels on said one axle, by a second wheel control section, the braking pressure applied to the brakes for the wheels on said other axle to reduce the braking pressure when either one of the wheels on said other axle is about to be locked, and promoting the reduction of braking pressure to the brakes on said other axle, as compared to the brakes on said one axle, to minimize braking interference of the wheels on said other axle as compared to the reduction of braking pressure applied to the brakes on said one axle such that slip ratios of the wheels on said other axle become lower than those of the wheels on said one axle to minimize braking interference of the wheels on said other axle with respect to the wheels on said one axle.

2. A method as claimed in claim 1 wherein the reduction of braking pressure to the brakes for the wheels on said other axle is promoted by making the reduction of braking pressure take place more readily.

3. A method as claimed in claim 1 wherein the reduction of braking pressure to the brakes for the wheels on said other axle is promoted by establishing parameters for determining when a wheel is about to be locked which are less for the brakes for the wheels on said other axle than for the brakes for the wheels on said one axle.

4. A method as claimed in claim 1 wherein said parameters include wheel speed and the value of wheel speed at which brake pressure reduction takes place for the wheels on said other axle is higher than that for the wheels on said one axle.

5. A method as claimed in claim 1 wherein the reduction of braking pressure to the brakes for the wheels on said other axle is promoted by maintaining any reduction of braking pressure to the brakes for the wheels on said other axle until after the braking operation has ceased even though it is determined that the wheels on said other axle are not about to become locked.

6. A method as claimed in claim 1 wherein the reduction of braking pressure to the brakes for the wheels on said other axle is promoted by maintaining any reduction of braking pressure to the brakes for the wheels on said other axle for a given period of time after it is determined that the wheels on said other axle are not about to become locked.

7. A method as claimed in claim 1 wherein a torque transmission means is interposed between one shaft leading to said power unit and another shaft leading to one of the axles, a torque being transmitted between said two shafts via said torque transmission means in correspondence with relative rotational speed between the shafts, the torque transmission providing said transmission of braking force between said axles when braking force is applied to the wheels on either axle.

8. A method as claimed in claim 1 wherein said torque transmission is carried out through a division clutch.

9. An antilock brake device for a four wheel drive vehicle having front and rear axles, left and right wheels on each axle with brakes associated with each wheel, a power unit drivingly connected to a first of said axles, a torque transmission connecting the second of said axles to said power unit, a hydraulic braking system for supplying hydraulic pressure to the brakes during a braking operation, means interconnecting said front and rear axles via said torque transmission which allows transmission of a braking force between said axles, and an antilock control device coupled to said braking system for controlling the hydraulic braking pressure to reduce the braking pressure when a wheel is about to be locked, the brakes for the wheels on one of the axles being subjected to greater braking force during braking than the brakes on the other of the axles, said antilock control device comprising a first wheel control section for controlling the hydraulic braking pressures supplied to the brakes of the wheels on said one axle separately from each other and a second wheel control section for controlling the hydraulic braking pressure supplied to the brakes of the wheels on said other axle in common with each other but separately from the brakes of the wheels on said one axle, said second control section including means for promoting the reduction of braking pressure applied to the brakes on the wheels on said other axle as compared to the reduction of braking pressure applied to the brakes by said control section of said one axle such that slip radios of the wheels on said other axle become lower than those of the wheels on said one axle to minimize braking interference of the wheels on said other axle with respect to the wheels on said one axle.

10. An antilock brake device as claimed in claim 9 wherein said first and second wheel control sections respectively include means for supplying reference parameters for determining whether the respective wheels are about to become locked, said means for promoting the reduction of braking pressure applied to the brakes of the wheels on said other axle being constituted by reference parameters supplied to the second control section which are less intense than those supplied to the first control section so that the reduction of braking pressure to the brakes of the wheels on said other axle takes place more readily than to the brakes of the wheels on said one axle.

11. An antilock brake device as claimed in claim 10 wherein one of said reference parameters is wheel speed and a second of said reference parameters is wheel deceleration, the value of wheel speed supplied to the second control section being higher than that supplied to the first control section the value of wheel deceleration supplied to the second control section, being higher than that supplied to the first control section.

12. An antilock brake device as claimed in claim 11 wherein said second control section includes logic elements which determine when one of the wheels on said other axle is about to be locked based on said reference parameters.

13. An antilock brake device as claimed in claim 9 wherein said antilock control means further comprises wheel detectors for detecting the speed of rotation of the wheels on said other axle respectively and means for supplying a signal representative of the slower rotating wheel on said other axle for determining when the slower rotating wheel is about to be locked.

14. An antilock rake device as claimed in claim 9 wherein said means for promoting the reduction of braking pressure applied to the brakes of the wheels on said other axle comprises sensor means for sensing a braking operation and means for maintaining any reduction of braking pressure effected during a braking operation until said braking operation has been completed as determined by said sensor means.

15. An antilock brake device as claimed in claim 14 wherein said sensor means comprises a brake operation detector and the means for maintaining any reduction of braking pressure comprises a flip-flop connected to said detector.

16. An antilock brake device as claimed in claim 9 wherein said control section for said wheels on said other axle includes means for producing an output signal to initiate reduction of braking pressure when a wheel on said other axle is about to be locked, said means for promoting the reduction of braking pressure comprising means for maintaining any reduction in braking pressure for a given period of time after cessation of said output signal.

17. An antilock brake device as claimed in claim 16 wherein said means for maintaining any reduction of braking pressure comprises a delay circuit.

18. An antilock brake device as claimed in claim 9 wherein said torque transmission is interposed between one shaft leading to said second axle and another shaft leading to said power unit and is adapted to transmit a torque between these two shafts.

19. An antilock brake device as claimed in claim 9 wherein said torque transmission comprises a viscous clutch.

20. An antilock brake device for a four wheel drive vehicle having front and rear axles, left and right wheels on each axle with brakes associated with each wheel, speed detectors for detecting the speeds of the wheels, a power unit drivingly connected to a first of said axles, a torque transmission connecting the second axle to said power unit, a hydraulic braking system for supplying hydraulic pressure to the brakes during a braking operation, means interconnecting said front and rear axles via said torque transmission which allows transmission of a braking force between said axles, and an antilock control device coupled to said braking system for controlling the hydraulic braking pressure to reduce the braking pressure when a wheel is about to be locked, the brakes for the wheels on one of the axles being subjected to greater braking force during braking than the brakes on the other of the axles, said antilock control device comprising a first wheel control section for controlling the hydraulic braking pressures supplied to the brakes of the wheels on said one axle separately from each other and a second wheel control section for controlling the hydraulic braking pressure supplied to the brakes of the wheels on said other axle separately from the brakes of the wheels on said one axle, said second wheel control section for the brakes of said wheels on said other axle being provided with reference parameters for determining whether the wheels on said other axle are about to become locked, said second wheel control section including a low speed selector circuit means which selects as one of said reference parameters the lower one of the wheel speeds detected at the respective wheels on said other axle in order to control slip ratios of the wheels on said other axle to become lower than those of the wheels on said one axle to minimize interference of the wheels on said other axle with respect to the wheels on said one axle.

21. An antilock brake device, as claimed in claim 20 wherein said second wheel control section includes comparator means for comparing said selected lower one of the speeds of the wheels on said other axle with a reference value and, when a condition is satisfied that the selected lower wheel falls below the reference value, producing an output signal for suppressing increase in the hydraulic braking pressure applied to the brakes for the wheels on said other axle, said second wheel control section further including means for making said output signal of the comparator means effective for a further duration of time after said condition disappears.

22. An antilock brake device as claimed in claim 21 wherein said means which makes said output signal effective for a further duration of time is operative until a braking operation is terminated.

23. An antilock brake device as claimed in claim 21 wherein said means which makes said output signal effective for a further duration of time comprises a delay timer means.

* * * * *